United States Patent
Nicholson

[15] 3,643,619
[45] Feb. 22, 1972

[54] LONGITUDINAL TO ROTATIONAL MOTION

[72] Inventor: James H. Nicholson, 5501 Onacrest Drive, Los Angeles, Calif. 90043

[22] Filed: Aug. 3, 1970

[21] Appl. No.: 60,527

[52] U.S. Cl. ................................. 115/24, 74/191
[51] Int. Cl. ................................................. B63h 16/12
[58] Field of Search .............. 115/24; 74/191, 31, 25, 21, 74/57

[56] References Cited

UNITED STATES PATENTS

| 2,084,321 | 6/1937 | Corradino et al. | 115/24 X |
| 2,660,065 | 11/1953 | Williams | 74/25 |
| 3,107,541 | 10/1963 | Parsus | 74/57 |

*Primary Examiner*—Andrew H. Farrell
*Attorney*—Smyth, Roston & Pavitt

[57] ABSTRACT

An apparatus for providing a conversion between longitudinal and rotational motion including a screw member having a thread having a constant angle and with individual ones of the opposing lands of the thread serving as the rolling surface for a cone member. The cone member is positioned within the lands of the thread and the cone member engages only one of the lands at a time along a line contact. Relative longitudinal movement between the screw member and the cone member is accomplished simultaneously with a relative helical movement between the screw member and the cone member and with the longitudinal motion and the helical motion between the screw member and the cone member occurring in either direction depending upon which of the lands is engaged by the cone member. The cone member also has a rotation about its central axis and such rotation occurs in a single direction.

Other aspects of the invention include the use of the apparatus for converting between longitudinal and rotational motion as part of a propulsion device for a boat.

16 Claims, 5 Drawing Figures

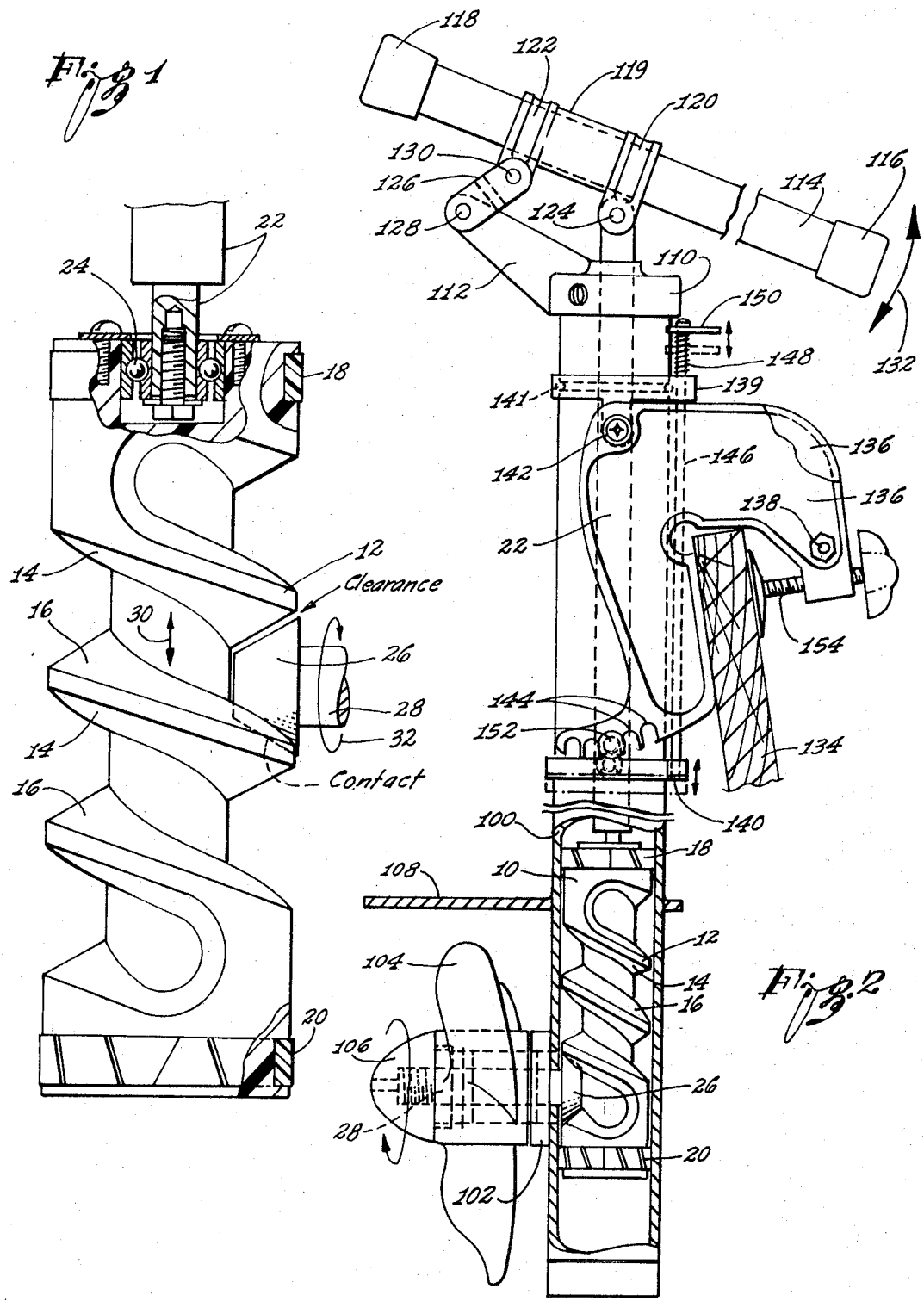

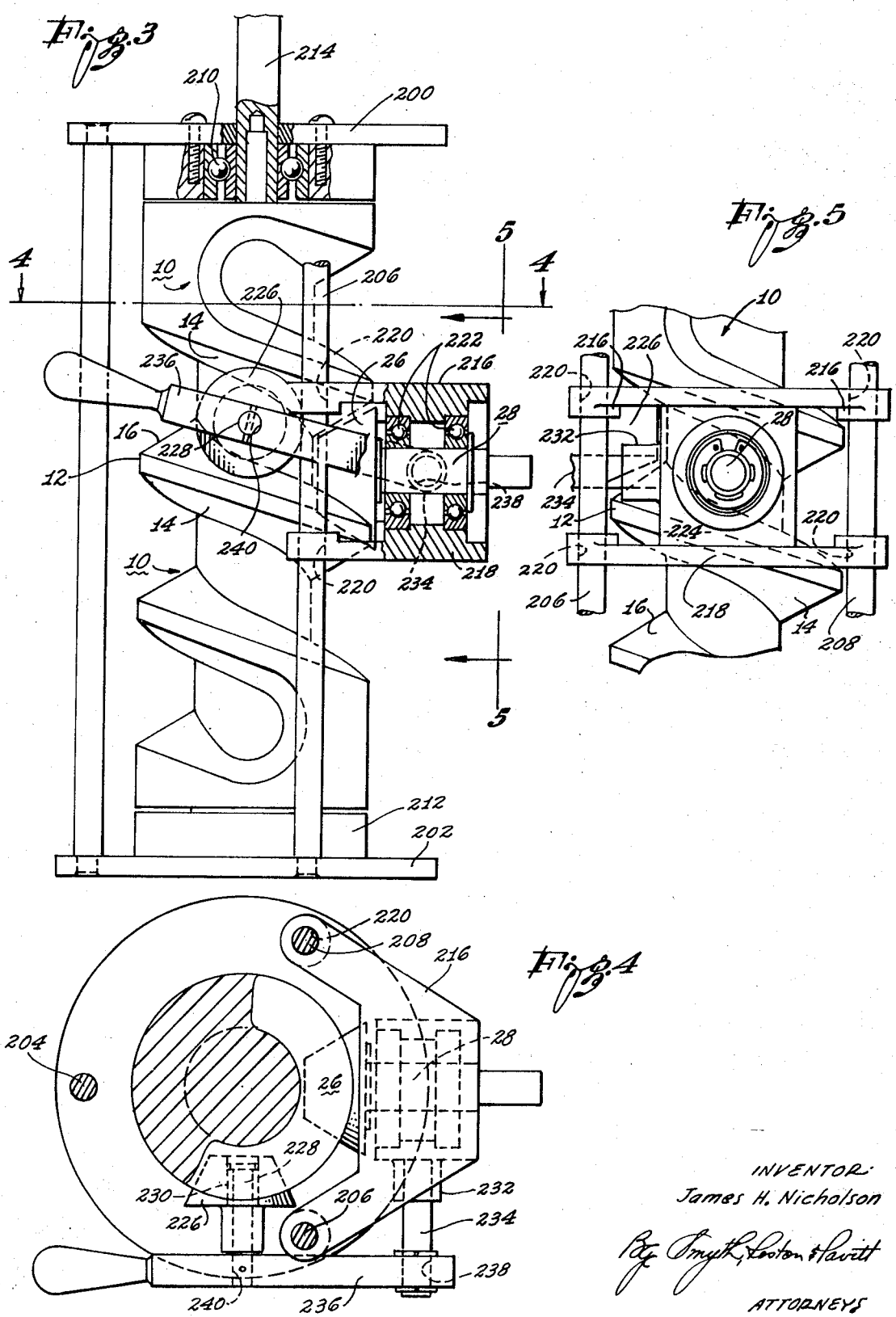

LONGITUDINAL TO ROTATIONAL MOTION

The present invention is directed to a device for providing for a conversion between longitudinal and rotational motion. It is often desirable to provide for such a conversion for different mechanical systems such as mechanical servosystems. The present invention has the capability to convert the longitudinal motion to rotary motion with a minimum number of elements and therefore is extremely simple to manufacture. The apparatus of the present invention may provide for direct rotational output in accordance with a longitudinal input or alternatively a longitudinal output in accordance with a rotational output. In addition to the conversion between longitudinal and rotational motions, the present invention provides for more complex movements including combinations of longitudinal, rotational and helical motions.

The elements of the apparatus of the present invention are basically two in number, and include a screw member having a thread having a constant angle extending around the central axis of the screw member and with the screw member having opposing lands serving as rolling surfaces and with the lands having a particular angular relationship relative to the central axis of the screw. Disposed between the lands of the thread is a cone member which has substantially the same configuration as the lands of the screw so that the cone member may contact the lands of the screw along a line contact. The cone member is positioned within the lands of the screw so that only one of the lands may be engaged by the cone member.

In order to provide for the conversion between longitudinal and rotational motion, both the screw member and the cone member may have longitudinal and rotational movements, and in addition there is a relative helical movement between the screw and the cone members during the conversion between the longitudinal and rotational motions. Specifically, the screw member may be rotatable about its central axis and may have longitudinal motion along its central axis. The cone member may have rotational motion about its central axis and may have longitudinal motion along an axis parallel to the central axis of the screw member. Limiting one of the motions of either the screw member or the cone member provides for various types of conversion between longitudinal and rotational motion. As examples, the following types of conversions may be possible.

The screw member may be maintained stationary both longitudinally and rotationally. It is then possible to provide for a helical movement of the cone member in either direction by choosing which of the lands is engaged by the cone member and by rotating the cone member about its central axis.

The screw member may be fixed longitudinally but be allowed to rotate about its central axis. By rotating the cone member in a single direction the cone member may move longitudinally along a line parallel to the central axis of the screw member in either direction depending upon which of the lands is engaged. The screw member will also rotate. As an alternative to the above, the screw member may be rotated and with the cone member engaging one or the other of the lands to provide for the longitudinal movement of the cone member along the line parallel to the central axis of the screw member.

The screw member may be allowed to move longitudinally and to have a rotation about its central axis. The cone member may be fixed longitudinally so that an engagement of either of the lands by the cone member provides for a conversion between the longitudinal movement of the screw member and the rotation of the cone member. The cone member rotates in a single direction even though the screw member is moved longitudinally in both directions.

Other variations of movement may be accomplished whereby some of the characteristic movements of the screw and cone member may be ignored or bypassed. For example, the cone member may be held in a frame to move in a longitudinal direction in accordance with a rotation of the screw member. The cone member may be used merely as a follower thereby ignoring the rotational movement of the cone member and with the longitudinal movement of the frame used in any desired manner.

A specific use of the conversion apparatus of the present invention is shown by a particular embodiment of the invention which uses the longitudinal to rotational motion apparatus incorporated in a propulsion device for use with boats. It is to be appreciated, however, that the invention is not to be limited to such use, and that any applications which require the conversion between longitudinal and rotary motion may profitably use the present invention.

In the use of the invention as part of a propulsion device, the screw member is positioned within a cylindrical shaft and may freely rotate about its central axis within the shaft. An arm member extending within the shaft is rotatably coupled to the screw member so that if the arm is moved in a longitudinal direction the screw member will follow. The cone member is positioned through an opening in the shaft to lie within the lands of the thread and the cone member, although allowed to freely rotate, is fixed so as not to have any longitudinal movement.

A longitudinal movement of the arm and thereby the screw member in alternate directions provides for alternate engagement of the cone member with the opposite lands of thread. The screw member moves longitudinally and rotates within the shaft. The cone member rotates in a single direction even though the screw member is being moved in alternate opposite longitudinal and rotational directions. A clamping means may be provided to clamp the structure to the boat and the vertical position may be adjusted to compensate for the various angles of the side of the boat. A propeller is coupled to the cone member to provide for movement of the boat in accordance with the actuation of the arm member. The clamping means may be such so as to allow the shaft to be rotated within the clamping means so that the propeller may be positioned in the water to provide for different directions of thrust to produce a steering control as the boat is being moved by the propeller.

A clearer understanding of the invention will be had with reference to the following description and drawings wherein:

FIG. 1 illustrates the motion conversion apparatus of the present invention as constructed for use as part of a propulsion device;

FIG. 2 illustrates the motion conversion apparatus of FIG. 1 enclosed within a shaft member and formed as a propulsion device;

FIG. 3 illustrates the motion conversion apparatus for the present invention formed as part of a mechanical servosystem;

FIG. 4 illustrates a view of the structure of FIG. 3 taken along line 4—4 of FIG. 3; and FIG. 5 illustrates a view of the structure of FIG. 3 taken along line 5—5 of FIG. 3.

In FIG. 1 a conversion apparatus of the present invention is shown which may be used as part of a propulsion device. Specifically, the apparatus of FIG. 1 includes a screw member 10 having a thread 12 having a constant angle disposed around a central axis of the screw member 10. The thread 10 includes opposing land surfaces 14 and 16. A pair of antifriction bearing surfaces 18 and 20 are disposed at either end of the screw member 10.

The upper end of the screw member 10 is rotatably mounted on an arm member 22. The rotation between the screw member 10 and the arm member 22 may be accomplished using a bearing structure 24 which, as shown in FIG. 1, includes ball bearings. It is to be appreciated that types of bearing structures other than ball bearings may be used and that the ball bearings are illustrative only.

Disposed within the thread 12 between lands 14 and 16 is a cone member 26 held at the end of a shaft 28. As can be seen, the cone member has the same angular relation to its central axis as do the lands 14 and 16 to a line perpendicular to the central axis of the screw member. The cone member 26 is positioned in such a manner that the cone member can only contact one of the lands 14 and 16. Therefore, it is possible to engage the cone 26 with either but not both of the lands 14 and 16 along a line contact. This eliminates any interference by dragging of the surface opposite to that engaging a land.

Assuming that the screw member 10 may be moved in either direction as shown by the arrow 30, and assuming first that the screw member is moved in an upward direction so that the cone member 26 engages the land 16, the angle of the lead of the thread 12 of the screw 10 causes a relative rotation between the cone member 20 and the screw member 10. As shown in FIG. 1, the cone member 26 will rotate in the direction indicated by the arrow 32. If the screw member 10 is moved in a downward direction so that the cone member 26 engages the land 14, this provides for an opposite rotation of screw member 10 relative to the direction of rotation when the screw member is moved in the upward direction, but the cone member 26 will still rotate in the same direction as indicated by arrow 32. Even though the cone member 26 engages opposite lands of the thread 12 of screw member 10 depending upon the longitudinal direction of movement of the screw member 10, the cone member 26 always rotates in the same direction.

The structure shown in FIG. 1 may be directly incorporated in a propulsion device for use with boats as shown in FIG. 2, and the same elements of FIG. 1 are given similar reference characters in FIG. 2. Specifically in FIG. 2, the screw member 10 is shown disposed within a cylindrical shaft member 100 wherein the antifriction surfaces 18 and 20 contact the inner walls of the shaft member 100 and allow for the screw member 10 to be moved both in a longitudinal direction within the shaft 100 and also to rotate within the shaft 100 around the arm member 22.

As shown in FIG. 2, the cone member 26 is maintained at a fixed longitudinal position along the length of the shaft 100 by support means 102. The shaft 28 is extended and has a threaded outer end. A propeller 104 is mounted on the shaft 28 to freely rotate with the shaft 28 and the cone 26. The propeller 104 is held in position on the shaft 28 by a nut member 106. A baffle member 108 is shown disposed above the propeller 104 to provide for a more efficient movement of the boat as the propeller is rotated.

The arm member 22 is shown extending upward through the cylindrical shaft member 100 and is held in a central upward position by a cylindrical member 110 which includes an outwardly extending flange portion 112. The arm member 22 is actuated in a longitudinal direction within the shaft 100 using a handle member 114. The handle 114 may be a hollow tube having its ends enclosed by cap members 116 and 118. A collar member 119 having end portions 120 and 122 surrounds the handle 114. The end portion 120 and the shaft member 22 are coupled together at a pivot point 124 so as to allow for the handle 114 to pivot at the point 124. A link member 126 is coupled between the end portion 122 and the flange 114, and the link member is coupled to the flange 114 and the end portion 122 at pivot points 128 and 130 so as to allow the handle 114 to pivot around flange 112 while maintaining the shaft 22 in a central location within the cylindrical shaft 100.

It can be seen, therefore, that the handle 114 may be moved up and down as shown by the arrow 132 so as to produce longitudinal movement of the arm 22 within the shaft 100 which in turn produce longitudinal movement of the screw member 10 within the shaft 100. As the screw member 10 moves in a longitudinal direction, this produces a rolling motion between the cone 26 and the screw 10 which produces a rotation of the propeller 104. As explained above, the direction of rotation of the propeller 104 is in a single direction even though the screw member is moving up and down within the shaft 100, and even though the direction of rotation of the screw member 100 is reversing.

The propulsion device of FIG. 2 may be held onto a boat using a clamping apparatus including a pair of members 136 which are maintained in spaced relationship using bolt member 138. Also, the members 136 are connected on either side of the shaft 100 to an upper member 139 which is cylindrical and which surrounds the shaft 100. A lower cylindrical member 140 is similar in configuration to the member 139. The members 136 are coupled to the member 139 using bolt 142. The upper member 139 is restrained from sliding on the shaft 100 by a spline 141 but is allowed to rotate about the shaft 100. The lower member 140 may both slide and rotate on the shaft 100

In order to control the angle at which the propeller 104 is placed in the water relative to the boat 138, the members 136 include a plurality of adjustment slots 144. A pair of rod members 146 are spring loaded in an upward direction by spring member 148 and the rod members 146 interconnect the members 139 and 140. It can be seen, therefore, that the rod member normally maintains the member 140 in a upward direction. However, when it is desired to adjust the angle of the propeller 104 so as to compensate for different angles of the sides of the different boats, a plate member 150 may be pushed downward to free a bolt member 152 from a particular one of the slots 144, thereby allowing a different one of the slots 144 to be chosen or a complete disengagement so as to swing the propeller out of the water. The angle of the propeller 104 in the water may therefore be adjusted by positioning a desired one of the slots 144 over the bolt member 152. Finally, the entire structure may be held in place on the boat 134 using a pair of screw clamps 154 with each clamp passing through a lower portion of one of the members 136.

It is also possible to steer the boat by rotating the shaft 100 supporting the propeller within the members 139 and 140 using the handle 114 so as to vary the direction of thrust of the propeller. Also, the handle 114 may be slid through the collar member 119 and the shaft rotated 180° so that the boat may be propelled backwards. In this way, the boat may be both steered and propelled using one had since both the steering and the propelling are controlled by movements of the handle 114.

FIGS. 3, 4 and 5 illustrate apparatus of the present invention which may be used for mechanical servocontrol. In FIGS. 3 through 5, elements which are similar to those shown in FIGS. 1 and 2 will be given the same reference characters. In FIGS. 3, 4 and 5, the screw member 10 includes a uniform thread 12 having lands 14 and 16. A cone member 26 is shown disposed within the lands 14 and 16 and the cone member may contact one or the other, but not both of the lands 14 and 16. A pair of plate members 200 and 202 are disposed at either end of the structure and are interconnected by posts 204, 206 and 208. A bearing structure such as a ball bearing 210 is mounted at one end adjacent the plate 200. A similar bearing structure 212 may be mounted adjacent the plate 202. A shaft member 214 passes through the bearing 212 and is connected to the upper end of the screw 10. It can be seen, therefore, that a rotation of the shaft 214 provides for a rotation of the screw member 10 between the plates 200 and 202, and within the posts 204, 206 and 208.

A frame member 224 includes upper and lower arm portions 216 and 218 which have openings 220 to enclose the posts 206 and 208. It can be seen, therefore, that the arms 216 and 218 supporting the frame 224 can slide longitudinally along the posts 206 and 208. The cone member 26 and the shaft 28 is maintained rotationally within the frame 224 using a bearing structure such as ball bearing 222. It is to be appreciated that other types of bearings may be used and that ball bearings are illustrative only.

In order to have the cone member 26 engage a desired one of the lands 14 and 16, a control structure may be included to effect a forced line contact between the cone 26 and the desired one of the lands 14 and 16. For example, a free-rolling control cone 226 may be included within the thread lands and is rotatably mounted on a shaft 228 with a bearing structure 230. A boss member 232 extends from the frame 224 and supports a post 234. The arm 236 includes an opening 238 which is disposed around a post 234. In addition, an opening 240 in the arm 236 is disposed around the shaft 228. An upward motion of the control arm 236 moves the control cone 226 into engagement with the land 114 and also moves the cone member 26 into engagement with the land 16. The position of the control arm 236 may be reversed so that the cone 26 engages the upper land 14. It is to be appreciated that the control structure shown is illustrative only and that other forms of control structures may be used to allow for the movement of the cone 26 into permanent or incremental engagement with either of the lands 14 and 16.

In the example shown in FIGS. 3 through 5, the cone 26 engages the land 16. It can be seen, therefore, that a rotation of the shaft 214 will provide a longitudinal movement of the control cone 26 and the entire frame structure 224 along the rods 206 and 208. At the same time, the control cone 26 rotates and such rotation may or may not be used as part of the servoing. The land 14 may be engaged by the control cone 26 by reversing the position of the control arm 236 so that the control cone 226 engages the land 16 and at that time a rotation of the shaft member 214 again provides for a longitudinal movement of the cone 26 and frame 224 and also a rotation of shaft 28.

It is also possible to provide for the longitudinal movement of the cone 26 and the frame member 224 by rotating the shaft 28 when the control cone 26 is in engagement with either of the lands 14 and 16. Also, it can be seen that the shaft 214 may be maintained stationary and a rotation of the shaft 28 may be provided whereupon the cone 26 and the frame member 224 will not only move longitudinally but the entire structure including the rods 204, 206 and 208 supporting the frame member 224 and the control cone 26 will rotate around the screw member 10. It is, therefore, seen that a variety of movements may be accomplished so that a plurality of mechanical servoing operations may be produced. It is to be appreciated that geared surfaces may be used as part of the thread and the cone so that a positive positioning is produced to provide for a high degree of accuracy in the relative movement of the motion conversion apparatus of the present invention. It is to be appreciated that the above description is illustrative in describing particular embodiments of the invention, but that the invention is only to be limited by the appended claims.

I claim:

1. An apparatus for providing a conversion between longitudinal and rotational motion, including
    a screw member having a thread having a constant angle extending around the central axis of the screw member with the lands of the thread having particular angular relationships to a line perpendicular to the central axis of the screw,
    a cone member rotatable about a central axis and positioned within the lands of the thread and with the cone member having an angular configuration relative to the central axis of the cone member substantially identical to the particular angular relationships of the lands of the thread to the line perpendicular to the central axis of the screw and with the size of the cone member smaller than the distances between the lands of the thread to allow the outer surface of the cone member to engage either land of the thread along a line contact, and
    the screw member and cone member providing for relative longitudinal movement and rotational movements in first directions when the cone member engages one of the lands of the thread and with the screw member and cone member providing for relative longitudinal and rotational movements in second directions when the cone member engages the other of the lands of the thread and with a rotation of the cone member about the central axis in the same direction when the cone member engages either of the lands of the thread.

2. The apparatus of claim 1 wherein
    the screw member is mounted for rotation about its central axis to provide for the relative longitudinal movement between the screw member and the cone member along a line parallel to the central axis of the screw member.

3. The apparatus of claim 1 wherein
    the screw member is maintained in a fixed longitudinal position to provide for longitudinal and rotational movement of the cone member.

4. The apparatus of claim 1 wherein
    the screw member is mounted for rotation about its central axis and is maintained in a fixed longitudinal position to provide for longitudinal movement of the cone member along a line parallel to the central axis of the screw member.

5. The apparatus of claim 1 wherein
    the screw member is mounted for rotation about its central axis and the cone member is maintained in a fixed longitudinal position to provide for rotation of the cone member in the same direction in accordance with longitudinal movement of the screw member in either direction.

6. The apparatus of claim 5 wherein
    the screw member rotates and is moved longitudinally within a cylindrical shaft member and the cone member is mounted for rotation at a fixed longitudinal position along the shaft member.

7. The apparatus of claim 6 wherein
    an activating arm is coupled to the screw member to provide for the longitudinal movement of the screw member in both directions and a propeller is coupled to the cone member to provide for rotations of the propeller in the same direction in accordance with actuations of the actuating arm in both directions.

8. An apparatus for providing a conversion between longitudinal and rotational motion including
    a screw member having a thread extending along at least a portion of the length of the screw member and having lands forming the sidewalls of the thread,
    a first cone member positioned within the lands of the thread at a location to provide for engagement between the outer surface of the cone member and one of the lands of the thread and with the cone member including a shaft extending from the cone, and
    means for providing engagement between the cone member and one of the lands of the thread of the screw members for producing relative longitudinal movement between the screw member and the cone member in two directions and for providing rotation of the shaft member.

9. The apparatus of claim 8 wherein
    the screw member is maintained in a fixed longitudinal position and is rotatable about a central axis of the screw member to provide for longitudinal movement of the first cone member and rotation of the screw member.

10. The apparatus of claim 8 wherein
    the cone member is maintained in a fixed longitudinal position and the screw member is rotatable about a central axis of the screw member to provide for the rotation of the first cone member and longitudinal movement of the screw member.

11. The apparatus of claim 8 wherein the last mentioned means includes at least a second cone member positioned within the lands of the thread and interconnected with the first cone member and with an engagement of the second cone member with one of the lands of the thread producing an engagement of the first cone member with an opposite one of the lands of the thread.

12. The apparatus of claim 8 wherein
    the screw member is rotatably disposed within a cylindrical shaft member and is moved in a longitudinal direction within the cylindrical shaft member by an actuating arm and wherein the first cone member is maintained in a fixed longitudinal position along the shaft member to provide rotations of the first cone member in accordance with movements of the actuating arm.

13. The apparatus of claim 8 additionally including
    clamping means for clamping the apparatus to a boat and additionally including a propeller coupled to the shaft member to provide a propulsion device.

14. An apparatus for providing a conversion between longitudinal and rotational motions, including
    a cylindrical shaft member,
    a screw member disposed within the shaft member and having a uniform threaded portion with opposing lands, an arm member extending within the cylindrical shaft and rotatably coupled to the screw member, means coupled to the arm member for providing longitudinal movements of the arm and screw members within the shaft, a cone member mounted at a position along the shaft and with the cone member extending through an opening in the shaft and positioned within the lands of the thread for engagement with one or the other of the lands of the thread in accordance with the direction of longitudinal movement of the screw member and with the cone member rotating in a single direction with engagement of the cone member with one or the other of the lands of the thread.

15. The apparatus of claim 14 additionally including means for mounting the apparatus on a boat and additionally including a propeller coupled to the cone member to provide a propulsion device for a boat.

16 The apparatus of claim 14 wherein the means for mounting allows the shaft to be rotated to provide for a rudder control.

* * * * *